(12) United States Patent
Park

(10) Patent No.: US 10,501,072 B2
(45) Date of Patent: Dec. 10, 2019

(54) HYBRID VEHICLE AND METHOD OF CONTROLLING TRANSMISSION

(71) Applicants: HYUNDAI MOTOR COMPANY, Seoul (KR); KIA MOTORS CORPORATION, Seoul (KR)

(72) Inventor: Joon Young Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 252 days.

(21) Appl. No.: 15/718,885

(22) Filed: Sep. 28, 2017

(65) Prior Publication Data
US 2018/0118191 A1    May 3, 2018

(30) Foreign Application Priority Data
Nov. 2, 2016    (KR) .......................... 10-2016-0145293

(51) Int. Cl.
*B60W 20/30* (2016.01)
*B60W 10/08* (2006.01)
(Continued)

(52) U.S. Cl.
CPC ............ *B60W 20/30* (2013.01); *B60W 10/08* (2013.01); *B60W 10/11* (2013.01);
(Continued)

(58) Field of Classification Search
CPC ...... B60W 20/30; B60W 10/08; B60W 10/11; B60W 2510/0657; B60W 2510/083;
(Continued)

(56) References Cited

U.S. PATENT DOCUMENTS 7,090,615 B2 *    8/2006   Matsumura ........... B60W 10/02
                                                              477/78
9,707,953 B2 *    7/2017   Nefcy ................... B60W 30/19
                            (Continued)

FOREIGN PATENT DOCUMENTS

JP           11-59233 A       3/1999
JP        2001-235016 A       8/2001
                (Continued)

OTHER PUBLICATIONS

Office Action of corresponding Korean Patent Application No. 10-2016-0145293—5 pages, (dated Feb. 27, 2018).

*Primary Examiner* — Mary Cheung
(74) *Attorney, Agent, or Firm* — Knobbe Martens Olson & Bear LLP

(57) ABSTRACT

Disclosed herein are a hybrid vehicle and method of controlling a transmission therefor, and more particularly, a method of controlling a transmission capable of predicting a driver's required torque to reduce unnecessary gear-shifts and improve fuel efficiency, and a hybrid vehicle for performing the same. In one aspect of the present invention, a method of controlling a transmission of a parallel type hybrid vehicle may include determining a first torque, the first torque being a current required torque, determining a second torque, the second torque being a required torque expected to be generated at a near-future time after a current time, comparing, when the first torque is greater than or equal to a first threshold, the second torque with a second threshold set according to the near-future time, and performing downshifting when the second torque is greater than or equal to the second threshold as a result of the comparison.

19 Claims, 9 Drawing Sheets

(51) Int. Cl.
*B60W 10/11* (2012.01)
*F16H 61/02* (2006.01)

(52) U.S. Cl.
CPC . *F16H 61/0213* (2013.01); *B60W 2510/0657* (2013.01); *B60W 2510/083* (2013.01); *B60W 2510/1005* (2013.01); *B60W 2520/10* (2013.01); *B60W 2540/10* (2013.01); *B60W 2540/12* (2013.01); *B60W 2550/402* (2013.01); *B60W 2710/083* (2013.01); *B60W 2710/1005* (2013.01); *B60Y 2200/92* (2013.01); *Y10S 903/93* (2013.01); *Y10S 903/945* (2013.01)

(58) Field of Classification Search
CPC ..... B60W 2510/1005; B60W 2520/10; B60W 2540/10; B60W 2540/12; B60W 2550/402; B60W 2710/083; B60W 2710/1005; F16H 61/0213; Y10S 903/93; Y10S 903/645; B60Y 2200/92
See application file for complete search history.

(56) References Cited

U.S. PATENT DOCUMENTS

| | | | |
|---|---|---|---|
| 2003/0000751 A1* | 1/2003 | Denton | B60K 6/485 180/65.7 |
| 2005/0170931 A1* | 8/2005 | Maekawa | B60W 10/06 477/111 |
| 2011/0132324 A1* | 6/2011 | Kociba | F02D 41/0002 123/406.23 |
| 2013/0297160 A1* | 11/2013 | Kar | B60W 10/06 701/54 |
| 2015/0321673 A1* | 11/2015 | Telborn | F02D 29/02 477/33 |
| 2016/0031432 A1* | 2/2016 | Gibson | B60W 10/02 477/5 |

FOREIGN PATENT DOCUMENTS

| | | |
|---|---|---|
| JP | 2004-270718 A | 9/2004 |
| JP | 2009-83840 A | 4/2009 |
| JP | 2010-95067 A | 4/2010 |
| JP | 2010-183733 A | 8/2010 |

* cited by examiner

HYBRID VEHICLE AND METHOD OF CONTROLLING TRANSMISSION

This application claims the benefit of Korean Patent Application No. 10-2016-0145293, filed on Nov. 2, 2016, which is hereby incorporated by reference as if fully set forth herein.

BACKGROUND

Field

The present disclosure relates to a hybrid vehicle and method of controlling a transmission therefor, and more particularly, to a method of controlling a transmission capable of predicting a driver's required torque to reduce unnecessary gear-shifts and improve fuel efficiency, and a hybrid vehicle for performing the same.

Discussion of the Related Art

An automatic transmission, which is a type of transmission used in automobiles or motorcycles, is capable of automatically changing the gear ratio according to the speed of the vehicle or the revolutions per minute (RPM) of the engine. Generally, the transmission operates under the control of a transmission control unit (TCU), and a transmission having a plurality of fixed gear ratios among the automatic transmissions is referred to as a step-variable transmission.

The step-variable transmission generally shifts up as the ratio of the RPM of the input stage to the RPM of the output stage, that is, the ratio of the RPM of the engine crankshaft to the RPM of the drive shaft (i.e., gear ratio), decreases.

When the vehicle is running at a high constant speed, the step-variable transmission is maintained at a high speed stage for high-efficiency operation of the engine. Here, the high stage may generally refer to the highest stage and/or next-highest stage (for example, 5-speed stage and 6-speed stage) and is also referred to as a cruising gear stage or an overdrive (OD) stage.

The disclosure of this section is to provide background of the invention. Applicant notes that this section may contain information available before this application. However, by providing this section, Applicant does not admit that any information contained in this section constitutes prior art.

SUMMARY

Accordingly, the present disclosure is directed to a hybrid vehicle and method of controlling a transmission that substantially obviate one or more problems due to limitations and disadvantages of the related art.

An aspect of the present invention is to provide a method of efficiently controlling a transmission in a hybrid vehicle and a vehicle for performing the same.

Particularly, an aspect of the present invention provides a transmission control method capable of determining whether or not to perform gear-shift by predicting a near-future required torque in a parallel type hybrid vehicle, and a vehicle for performing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages of the invention, as embodied and broadly described herein, a method of controlling a transmission of a parallel type hybrid vehicle may include determining a first torque, the first torque being a current required torque, determining a second torque, the second torque being a required torque expected to be generated at a near-future time after a current time, comparing, when the first torque is greater than or equal to a first threshold, the second torque with a second threshold set according to the near-future time, and performing downshifting when the second torque is greater than or equal to the second threshold as a result of the comparison.

In another aspect of the present invention, a parallel type hybrid vehicle may include a driving information detection unit configured to interoperate with various sensors of the hybrid vehicle to detect driving information according to operation of the vehicle, a driver acceleration/deceleration prediction unit configured to generate a predicted value of a near-future acceleration/deceleration intention of a driver reflecting a driving environment of the vehicle, using information transmitted from the driving information detection unit by utilizing an acceleration/deceleration prediction model, a hybrid control unit configured to determine a first torque and determine a second torque using the predicted value of the near-future acceleration/deceleration intention, the first torque being a current required torque and the second torque being a required torque expected to be generated at a near-future time after a current time, and a transmission control unit configured to compare, when the first torque is greater than or equal to a first threshold, the second torque with a second threshold set according to the near-future time and to control a transmission to perform downshifting when the second torque is greater than or equal to the second threshold as a result of the comparison.

In another aspect of the present invention, a parallel type hybrid vehicle may include a driving information detection unit configured to interoperate with various sensors of the hybrid vehicle to detect driving information according to operation of the vehicle, a driver acceleration/deceleration prediction unit configured to generate a predicted value of a near-future acceleration/deceleration intention of a driver reflecting a driving environment of the vehicle, using information transmitted from the driving information detection unit by utilizing an acceleration/deceleration prediction model, a hybrid control unit configured to determine a first torque and determine a second torque using the predicted value of the near-future acceleration/deceleration intention, the first torque being a current required torque and the second torque being a required torque expected to be generated at a near-future time after a current time, and a transmission control unit configured to transmit a gear-shift command to a transmission to perform downshifting when the first torque is greater than or equal to a first threshold value. The hybrid control unit may control the transmission control unit to maintain a current transmission gear stage when the first torque is less than the first threshold value or when the second torque is less than a second threshold value set according to the near-future time as a result of comparison between the second torque and the second threshold value.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
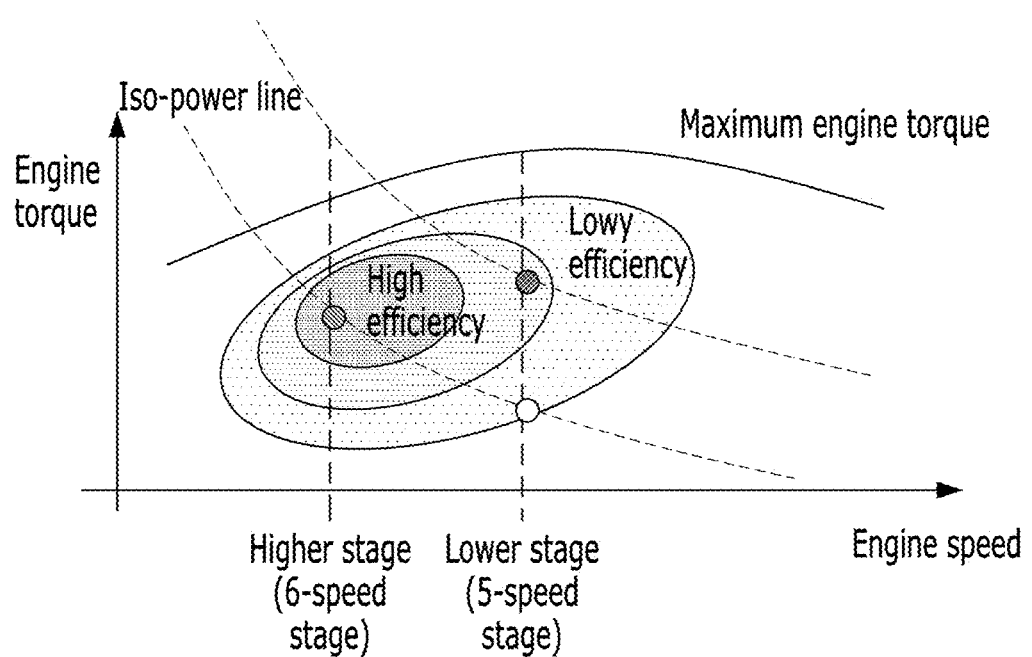
FIG. 1 illustrates a correlation between gear stages and efficiency.

Reference will now be made in detail to the preferred embodiments of the present invention, examples of which are illustrated in the accompanying drawings. Features of the present invention may, however, be embodied in many different forms and should not be construed as limited to the embodiments set forth herein. In order to clearly illustrate embodiments of the present invention in the drawings, parts not related to the description are omitted, and like parts are denoted by similar reference numerals throughout the specification.

Throughout the specification, when a part is referred to as "including" an element, it means that the part may include other elements as well, unless specifically stated otherwise. In addition, parts denoted by the same reference numerals throughout the specification denote the same components.

Hereinafter, the correlation between the gear stages and the efficiency will be described with reference to FIG. 1.

FIG. 1 illustrates a correlation between gear stages and efficiency.

In FIG. 1, it is assumed that the 6-speed stage is the highest drive stage in the step-variable transmission.

Referring to FIG. 1, when it is assumed that the driving system output power having a specific value is maintained, a corresponding iso-power line 11 is shown across the 6-speed stage and 5-speed stage. In addition, in terms of powertrain characteristics, the relative efficiency is indicated by the range of ellipses in the correlation between the engine torque and the RPM. In the iso-power line 11, using the 6-speed stage is more efficient than using the 5-speed stage, and accordingly the transmission is maintained at the 6-speed stage.

When the required torque becomes higher than or equal to a predetermined value due to operation of the driver during high constant speed travel, the step-variable transmission will shift to a lower stage (5-speed stage in this example) in order to satisfy the required torque. In general, a separate threshold line lower than the maximum torque at an upper stage gear is set in order to prevent the torque output from being lowered until the lower gear ratio is engaged. This will be described with reference to FIG. 2.

Figure 2:
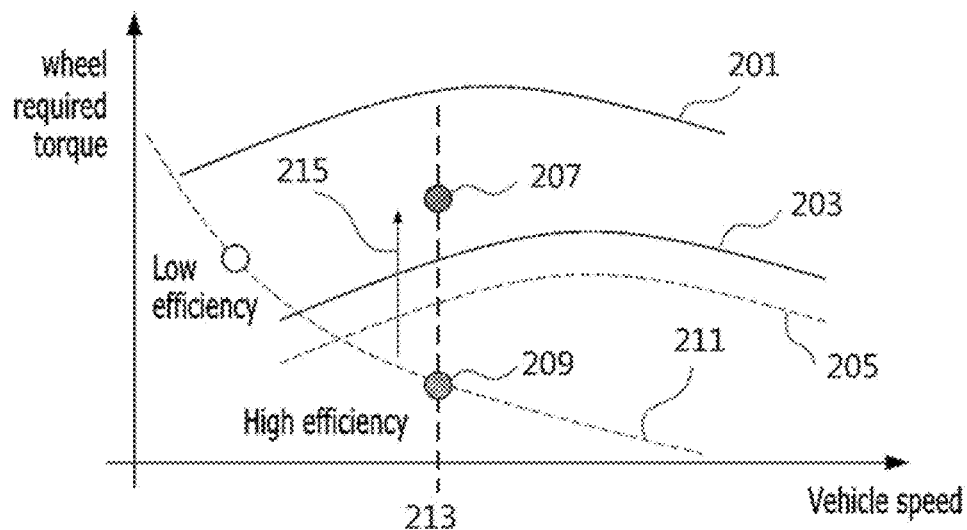
FIG. 2 illustrates a condition under which gear-shift is performed in response to a change in the required torque.

FIG. 2 illustrates a condition under which gear-shift is performed in response to a change in the required torque.

In FIG. 2, in contrast with FIG. 1, the horizontal axis represents the vehicle speed and the vertical axis represents the required torque of the drive shaft. In addition, the maximum torque of the engine at the 5-speed stage (lower stage) 201 is greater than the maximum torque of the engine at the 6-speed stage (higher stage) 203, and the shifting threshold line (or K/D shifting (6->5) threshold line) 205 according to the driver's accelerator pedal kick down (K/D) (hereinafter, simply referred to as "shifting threshold line") is set to be lower than the maximum engine torque of the engine at the 6-speed stage 203. Here, the shifting threshold line may be a fixed value for each gear stage of the transmission, or may be variably set according to the current vehicle speed 213.

When the vehicle is running at a constant speed, that is, at a cruise speed, the gear of the 6-speed stage, which has the highest efficiency, is used (at constant speed operation point 209. However, when the wheel required torque (at accelerating operating point 207) is higher than the shifting threshold line 205 (due to kickdown of the driver or the like), shift to the 5-speed stage occurs. In FIG. 2, reference numeral 215 refers to increase in required torque.

The demand for eco-friendly vehicles is increasing according to the demand for continuous improvement of fuel efficiency and strengthening of exhaust gas regulations in each country. As a practical solution to meet the demand, a hybrid electric vehicle (HEV)/plug-in hybrid electric vehicle (PHEV) is provided.

Such hybrid vehicles may provide optimum output power and torque according to how the engine and the motor are operated in harmony in the running process using two power sources consisting of the engine and the motor. Particularly, in a hybrid vehicle adopting a parallel type (or transmission mounted electric device (TMED) type) hybrid system, in which an electric motor and an engine clutch (EC) are mounted between the engine and the transmission, the output powers from both the engine and the motor may be simultaneously transmitted to the drive shaft. Of course, it is difficult to generate motor torque at all times/persistently due to constraints such as the state of charge (SOC), but temporary engine output assistance is possible.

Hereinafter, the correlation between the torque characteristics of the hybrid vehicle and the gear-shift stages will be described with reference to FIG. 3.

Figure 3:
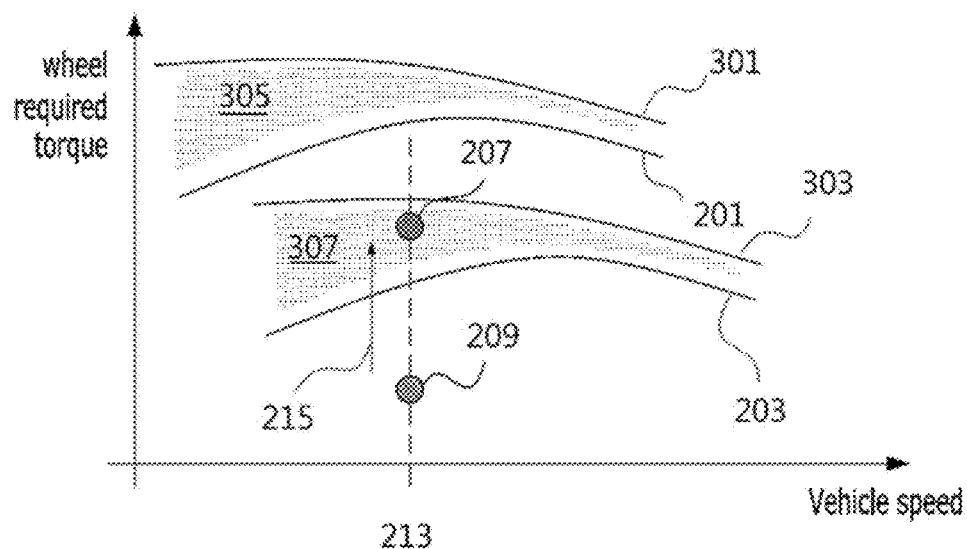
FIG. 3 illustrates a condition under which gear-shift is performed according to change in the required torque in a parallel type hybrid vehicle.

FIG. 3 illustrates a condition under which gear-shift is performed according to change in the required torque in a parallel type hybrid vehicle.

Referring to FIG. 3, in contrast with the typical vehicle, the parallel type hybrid vehicle allows addition of the torque of the motor to the maximum torque 201, 203 of the engine at each gear stage ( engine+motor maximum torque 301 for 5-speed stage, engine+motor maximum torque 303 for 6-speed stage), and therefore the torque that may be substantially transmitted to the drive shaft may be extended by the torque of the motor (motor areas 305 and 307).

Nevertheless, if the general shifting threshold line is set to be lower than the maximum engine torque of the corresponding stage (203 for 6-stage) in a similar manner to that of FIG. 2, unnecessary gear-shift may occur in various situations. This will be described with reference to FIG. 4. In FIG. 3, reference numeral 207 refers to the accelerating operating point, reference numeral 209 refers to the constant speed operating point, reference numeral 213 refers to the current vehicle speed, and reference numeral 215 refers to increase in required torque.

Figure 4:
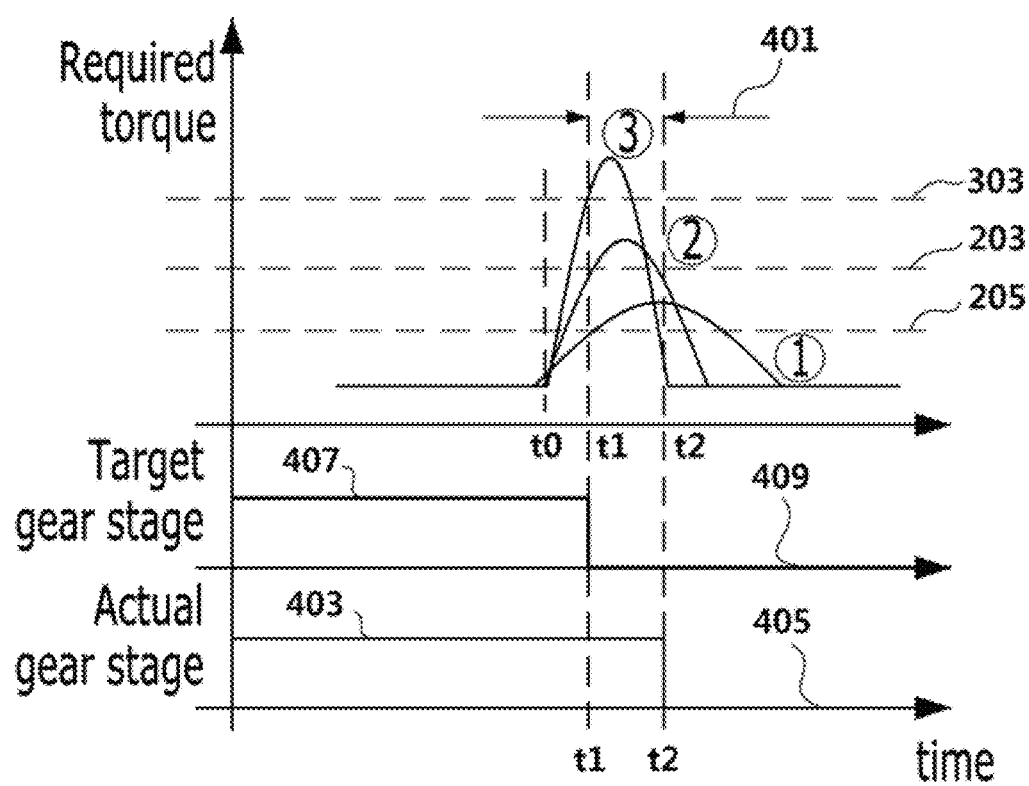
FIG. 4 illustrates a situation in which unnecessary gear-shift is caused by manipulation of an accelerator by a driver in a parallel type hybrid vehicle during travel at a high constant speed.

FIG. 4 illustrates a situation in which unnecessary gear-shift is caused by manipulation of an accelerator by a driver in a parallel type hybrid vehicle during travel at a high constant speed.

In FIG. 4, the horizontal axis and the vertical axis represent time and required torque, respectively, and it is assumed that a certain time (hereinafter, referred to "required time for gear-shift") is taken until gear-shift (i.e., actual gear-shift) occurs in the transmission after the TCU determines that gear-shift is necessary. In addition, in FIG. 4, it is assumed that the shifting threshold line is set to be lower than the engine maximum torque of each gear stage, and the required torque is temporarily increased due to intermittent manipulation of the accelerator by the driver and is then decreased back to the original required torque during constant speed travel at the 6-speed stage.

Referring to FIG. 4, the required torque increase pattern that causes unnecessary gear-shift may be broadly divided into three situations.

First, situation ① is a case where the required torque exceeds the current Kick-Down (K/D) shifting threshold line 205 of the current gear stage. In this situation, if gear-shift occurs even though the required torque may be sufficiently satisfied by the torque of the motor (i.e., the amount and time of increase in the required torque are within a range within which the motor is usable), efficiency is lowered.

Situation ② is a case where the required torque exceeds the engine torque limit 203 of the current gear stage. In this situation, if gear-shift occurs even though the required torque may be sufficiently satisfied by the torque of the motor, efficiency is lowered as in the previous case.

Situation ③ is a case where the required torque exceeds the motor usable range 303 of the current gear stage, but the torque decreases before the actual gear-shift because the time is too short. In this situation, gear-shift is substantially not necessary.

In the above-described situations, slip loss or the like occurs in a gear-shift preparation process, for example, shift intervention and shifting gears although gear-shift is not necessary in a typical parallel type hybrid vehicle. Thereby, energy is inefficiently consumed.

An aspect of the present invention provides a system and method for controlling gear-shifting operations in a hybrid vehicle which has a parallel-drivetrain. A controller installed in a vehicle monitors driver's input on an accelerator pedal, compute a (current) target torque (required torque) corresponding to the driver's current input on the pedal (a requested torque), and controls operation (including gear changes) of the vehicle to provide the target torque.

Referring to FIGS. 3 and 4, in response to a pedal input (at t=t0 in FIG. 4) while the vehicle is driving at a constant speed (the current vehicle speed in FIG. 3), the target torque becomes greater than a torque that can be generated by the engine at the current gear (403, 407, 6-speed stage). When the target torque is greater (Yes at S840) than the maximum torque available under the current gear (above the Higher stage (6-speed stage) engine+motor maximum 303 in FIG. 3) at the current speed, the controller is configured to determine whether the vehicle is shifting to a lower gear (405, 409, 5-speed stage) (at the gear-shift determination time point t1, FIG. 4).

To prevent an undesirable gear shifting to a lower gear in response to an accidental pedal input that will not last for the minimum required time for gear changes (required time for gear-shift 401 in FIG. 4), the controller estimate a future target torque for the driver's future (estimated) pedal input for a future time point (t2) that is at least after the minimum required time for gear changes from the gear-shift determination time point (t1). In embodiments, neural networks, machine learning techniques are used to predict the driver's future input and the future target torque and/or future.

In embodiments, using the estimated future target torque (at t2), the controller (1) controls the motor to generate assist torque without shifting to a lower gear (5-speed-stage) when the future target torque is greater than the maximum engine torque (with no assist torque of motor) of the current gear (6 speed-stage) but less than the 'engine+motor' maximum of the current gear (2) cause a transmission to a vehicle to a lower gear when the future target torque is greater than the 'engine+motor' maximum of the current gear, or (3) does not control the motor to generate assist torque or cause a shift to a lower gear when the future target torque is less than the maximum engine torque at the current speed (or at an estimated speed at t2).

In embodiments, the controller determines whether the future target torque is greater than a threshold (Threshold2 in S850) representing an upper limit of torque under the current gear. If determine so, the controller generates signals to change the vehicle's gear to a lower gear that can provide the future target torque. In embodiments, the controller generates signals for changing the vehicle's gear to a lower gear only when (1) the current target torque computed using the current pedal input for the current vehicle speed is greater than the maximum available torque under the current (higher) gear and (2) the future target torque estimated for a future time (at least after a minimum time necessary for a gear shift) is also greater than the maximum available torque under the current gear.

First, a hybrid vehicle structure to which embodiments of the present invention may be applied will be described with reference to FIG. 5.

Figure 5:
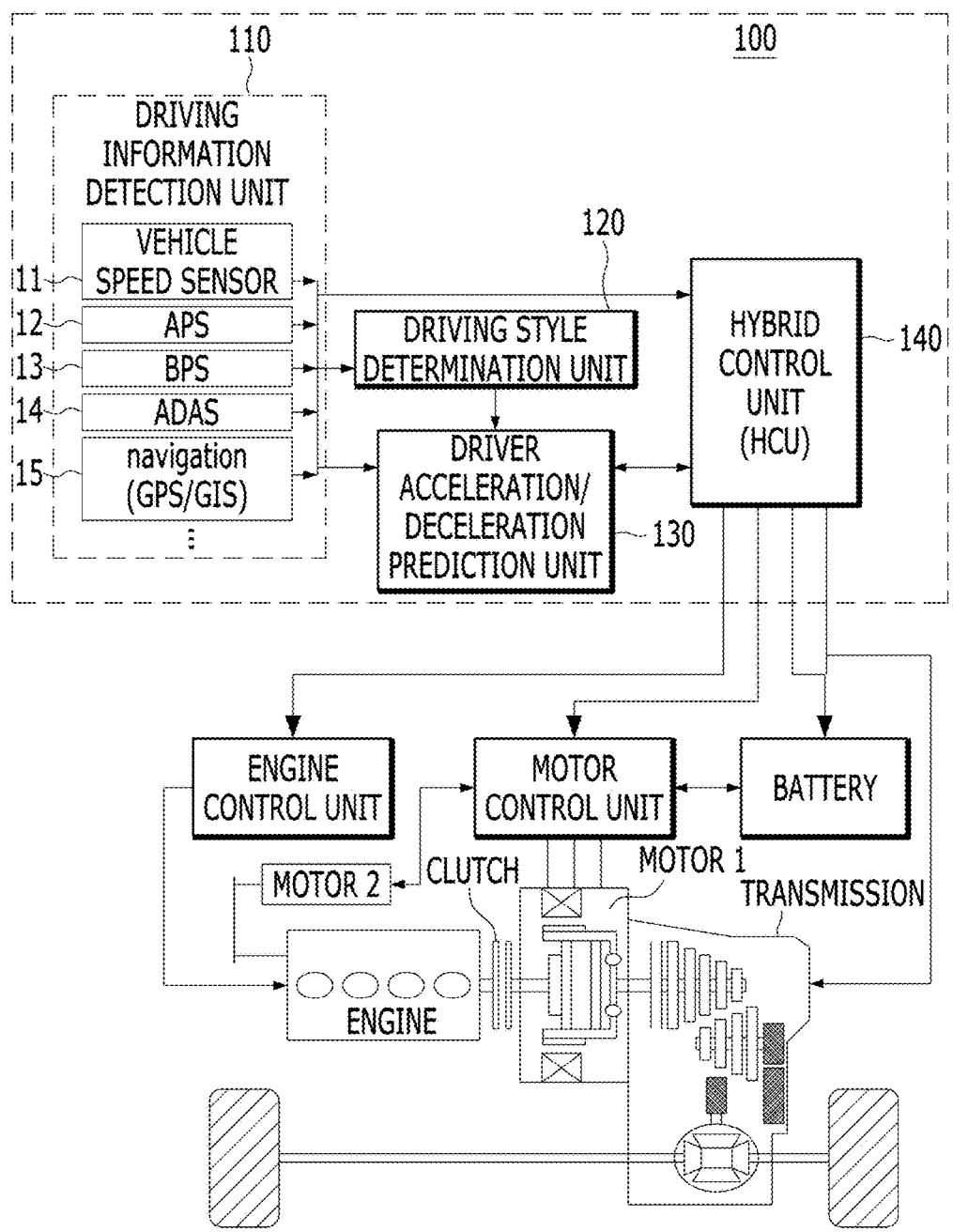
FIG. 5 is a block diagram schematically illustrating a transmission control system of a hybrid vehicle according to an embodiment of the present invention.

FIG. 5 is a block diagram schematically illustrating a transmission control system of a hybrid vehicle according to an embodiment of the present invention.

Referring to FIG. 5, the drive mode switching system 100 of a hybrid vehicle according to an embodiment of the present invention includes a driving information detection unit 110, a driving style determination unit 120, a driver acceleration/deceleration prediction unit 130, and a hybrid control unit 140. This configuration is merely illustrative, and the transmission control system may be configured to include fewer elements (e.g., omitting the driving style determination unit) or more elements.

The driving information detection unit 110 detects drive information according to driving of the vehicle in operative connection with at least one of a vehicle speed sensor 11, an accelerator position sensor (APS) 12, a brake pedal sensor (BPS) 13, an advanced driver assistance system (ADAS) 14, and a navigation unit 15.

The driving information detection unit 110 detects the driver's accelerator operation status through the APS 12 and detects the brake operation status through the BPS 13.

The driving information detection unit 110 detects the vehicle speed through the vehicle speed sensor 11 and detects front behavior information including the relative distance and acceleration with respect to a proceeding vehicle through a radar sensor, a (stereo) camera, or the like of the ADAS 14. Of course, besides the radar and camera, various sensors such as an ultrasonic sensor and laser may be utilized depending on the configuration of the ADAS.

The driving information detection unit 110 detects navigation information (road environment information) such as GPS/GIS-based location information about the vehicle, road type, congestion degree, speed limit, intersection, tollgate, turn and gradient information. To provide this information, the navigation unit 15 may reference a built-in navigation map and traffic information collected through external wireless communication (e.g., telematics, TPEG, etc.).

The driving style determination unit 120 determines the driver's driving style based on a drive pattern such as an average velocity, an APS change amount (dAPS), and a BPS change amount (dBPS) according to the driver's manipulation of the vehicle.

For example, the driving style determination unit 120 may configure a fuzzy membership function using measurement factors such as the APS change amount, the BPS change amount, the vehicle speed, the gradient, and the like detected by the driving information detection unit 110 as input parameters, and calculates a short-term driving style index (SI=0 to 100%).

The driving style determination unit 120 may determine the driving style of the driver at a plurality of levels by dividing the calculated short-term driving style index (SI=0 to 100%) based on a predetermined reference ratio according to the driving style intensity.

The driver acceleration/deceleration prediction unit 130 learns an acceleration/deceleration prediction model according to the driving style by utilizing machine learning scheme and yields a predicted value of the driver's near-future acceleration/deceleration intention reflecting the driving environment of the vehicle and the driving style by utilizing the acceleration/deceleration prediction model. That is, the driver acceleration/deceleration prediction unit 130 may use the vehicle speed, the radar information, the navigation information, and the driving style of the driver detected through the driving information detection unit 110 as input information to quantitatively digitize the type of driving manipulation that occurs in units of relatively short time. Thereby, the driver acceleration/deceleration prediction unit 130 may determine the driver's momentary intention of acceleration/deceleration and generate a predicted value of near-future acceleration/deceleration of the driver. The predicted acceleration/deceleration value may be configured with a strength and probability of stepping on an accelerator or a brake pedal in a predetermined time unit in the near future.

A specific prediction algorithm of the acceleration/deceleration prediction unit 130 may include a neural network that complements a pre-constructed prediction model using a machine learning technique, which will be described later in more detail.

The hybrid control unit 140 controls the operation of each part for drive mode switching of the hybrid vehicle according to an embodiment of the present invention, and that integrally controls, as the highest control unit, the engine control unit and the motor control unit connected over a network.

The hybrid control unit 140 may analyze the driver's current required torque detected by the driving information detection unit 110 through the APS or BPS and transmit the analyzed torque to the TCU. In addition, the hybrid control unit may predict a required torque at a specific time in the near future based on the received predicted near-future acceleration/deceleration value and, and transmit the predicted torque to the TCU.

The TCU may acquire information on the current required torque and the predicted near-future required torque value from the hybrid control unit 140 to determine whether or not to perform gear-shift and transmit a gear-shift command corresponding to the determination result to the transmission.

In some embodiments, if the acceleration/deceleration prediction unit 130 predicts even the near-future required torque using the predicted near-future acceleration/deceleration value, the acceleration/deceleration prediction unit 130 may directly transmit the value of the near-future required torque to the TCU.

Alternatively, the TCU may determine whether or not to perform gear-shift according to the current required torque, and the hybrid control unit 140 may determine whether or not to perform gear-shift based on the predicted value of the near-future required torque. The result of the determination performed by the hybrid control unit 140 may be transmitted to the TCU so as to override the gear-shift determination of the TCU.

In this embodiment, the driving style determination unit may be omitted depending on the configuration. In this case, the driver acceleration/deceleration prediction unit 130 may perform acceleration/deceleration prediction, excluding an input value related to the driving style.

Hereinafter, a method for the driver acceleration/deceleration prediction unit 130 to predict the driver's acceleration/deceleration intention will be described with reference to FIGS. 6A and 6B.

Figure 6A:
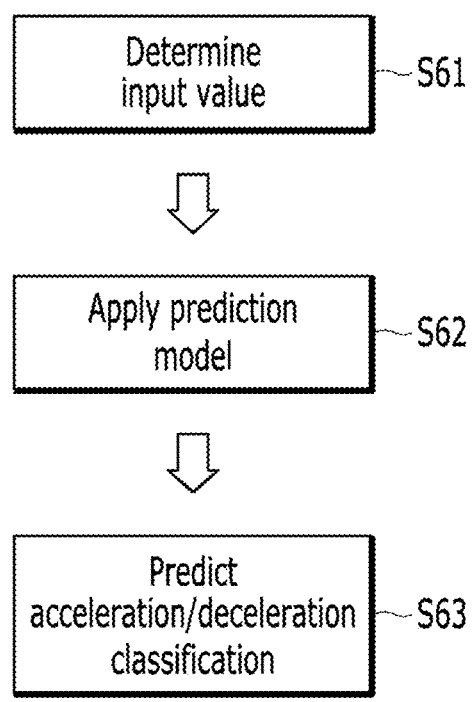
FIGS. 6A and 6B illustrate an exemplary process of predicting a driver's intention of acceleration/deceleration that may be applied to embodiments of the present invention.
Figure 6B:
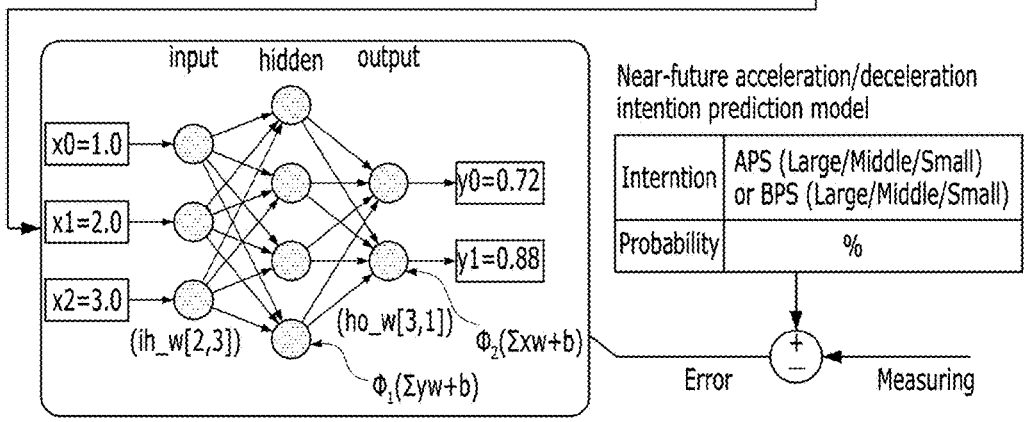

FIGS. 6A and 6B illustrate an exemplary process of predicting a driver's intention of acceleration/deceleration that may be applied to embodiments of the present invention.

Referring to FIG. 6A, the process of the driver acceleration/deceleration prediction unit 130 predicting the driver's acceleration/deceleration intention may be divided into three steps. Specifically, parameters to be used as input values for prediction may be determined first (S61). The prediction model may be modified through machine learning scheme (S62), and the acceleration and deceleration may be classified through the determined input value and the modified model to calculate a predicted value for a near-future situation (S63).

Here, determining the input value (S61) may include: 1) extracting candidates of the input value; 2) pre-processing input signals by integrating the input signals; and 3) selecting a final parameter using the pre-processed candidate values. As machine learning scheme, a time series model-based technique or a deep learning-based technique may be used. Examples of the time series model-based technique may include the autoregressive integrated moving average (ARIMA) technique, which describes changes in behavior over time with a stochastic indicator, and the multi-layer perceptron (MLP) technique, which uses nonparametric regression as a universal approximator. Examples of the deep learning-based technique may include the Stacked Auto Encoder (SAE) technique, which makes input/output data similar through dimension reduction, the Recurrent Neural Networks (RNNs) technique, which is a neural network algorithm to process sequential information, and the Long Short Term Memory (LSTM) technique suitable for long-term dependency learning. An example of the driver acceleration/deceleration prediction unit predicting the driver's near-future acceleration/deceleration intention using the neural network algorithm is shown in FIG. 6B.

Referring to FIG. 6B, the driver acceleration/deceleration prediction unit 130 according to an embodiment of the present invention includes a neural network that learns an acceleration/deceleration prediction model for each driving style of the driver using a machine learning technique.

Preferably, the driver acceleration/deceleration prediction unit 130 has a near-future acceleration/deceleration prediction model for each driving style pre-constructed based on big data which has been accumulated through test driving by utilizing the neural network before shipment of the vehicle.

Further, the driver acceleration/deceleration prediction unit 130 may reflect, in the near-future acceleration/deceleration prediction model for each driving style constructed using the neural network, the vehicle behavior data learned through actual driving of the vehicle after shipment of the vehicle, thereby generating a near-future acceleration/deceleration prediction model for each driving style personalized for the driver. At this time, the driver acceleration/deceleration prediction unit 130 may apply the learned behavior data to the near-future acceleration/deceleration prediction model of the corresponding driving style according to determination of the driver's driving style (mild, general, sporty, etc.).

The driver acceleration/deceleration prediction unit 130 may calculate a predicted value of the near-future acceleration/deceleration intention according to the driving style of the driver, using the driving environment that includes the vehicle speed, the radar information and the navigation information and the driving style of the driver as input information. Here, the driving style may be classified into a plurality of style types as shown in FIG. 6B, and may be configured by numerical values such as an average speed, an accelerator pedal change rate (dAPS), and a brake pedal change rate (dBPS)

In addition, the driver acceleration/deceleration prediction unit 130 may perform model modification according to the driver acceleration/deceleration model learning through machine learning scheme in real time while being mounted on the vehicle, or may receive a modified model from the outside and use the same for the prediction operation without learning.

In other words, when the model is allowed to be modified from the outside, the parameters serving as input values of learning may be transmitted to a telematics center or a cloud server, such that model modification through learning is performed from the outside and only a final model is transmitted to the vehicle.

Figure 7:
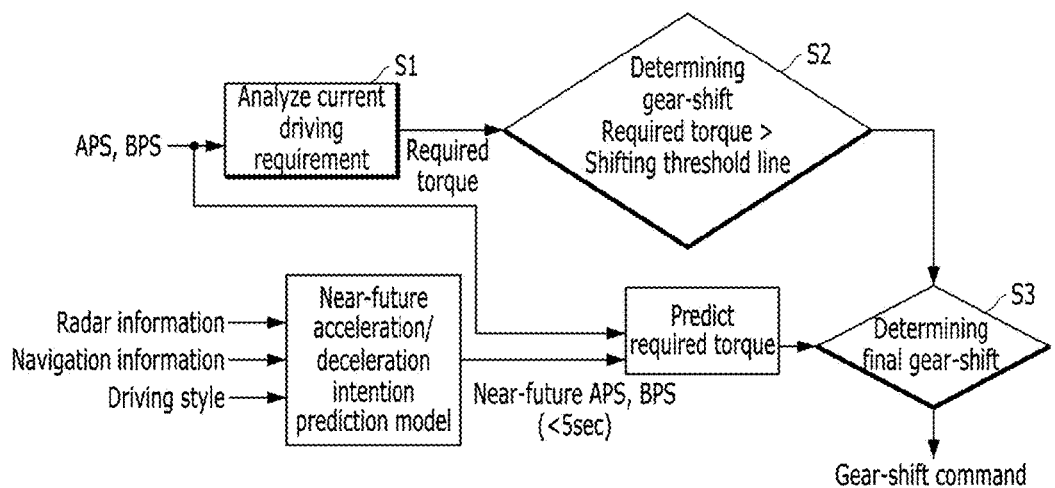
FIG. 7 illustrates a gear-shift determination method using a near-future acceleration/deceleration prediction model according to an embodiment of the present invention.

FIG. 7 illustrates a gear-shift determination method using a near-future acceleration/deceleration prediction model according to an embodiment of the present invention.

Referring to FIG. 7, the hybrid control unit 140 according to an embodiment of the present invention analyzes current operation requirements according to the driver's manipulation of the APS or BPS, calculates a required torque, and transmits the calculated torque to the TCU (S1). The TCU determines whether to perform gear-shift based on whether the current required torque is higher than the shifting threshold line, which is variably set according to the vehicle speed (S2).

Then, the TCU may additionally apply, to the gear-shift determination result according to the current required torque and the transmission threshold line, the predicted required torque value according to the driver's acceleration/deceleration intention prediction information using the near-future acceleration/deceleration prediction model in the driver acceleration/deceleration prediction unit 130, and finally determine whether to perform gear-shift (S3). Depending on the result of the determination, the TCU may transmit a gear-shift command to the transmission. Here, the predicted required torque value may be calculated by the driver acceleration/deceleration prediction unit 130 or may be calculated by the hybrid control unit 140. Although not shown in figure, the predicted required torque value may be calculated by a separate control unit for generating the predicted required torque value.

The drive mode switching method for the hybrid vehicle according to an embodiment of the present invention will be described in more detail with reference to FIG. 8, focusing on the drive mode switching system 100 of the hybrid vehicle described above.

Figure 8:
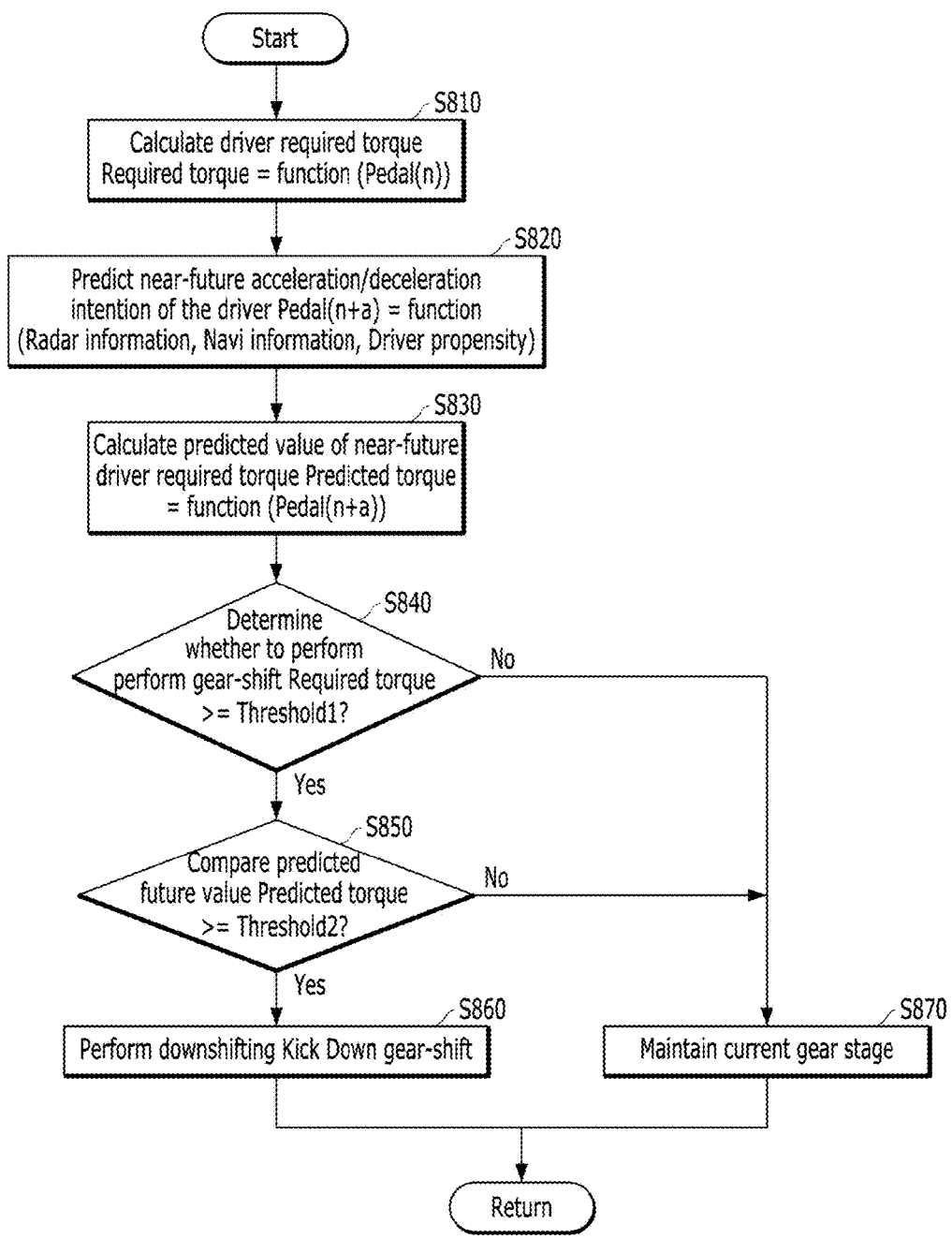
FIG. 8 is a flowchart illustrating a method of controlling a transmission of a hybrid vehicle according to an embodiment of the present invention.

FIG. 8 is a flowchart illustrating a method of controlling a transmission of a hybrid vehicle according to an embodiment of the present invention.

Referring to FIG. 8, the hybrid control unit first detects the APS change amount or the BPS change amount through the driving information detection unit 110, and calculates the current driver required torque (810). The calculated required torque may be transmitted to the TCU.

Here, the required torque may be obtained from a function of the pedal position Pedal(n) sensed by the current pedal sensors APS and BPS. More specifically, '(n)' has a positive (+) value when the accelerator pedal APS is operated, and a negative (−) value when the brake pedal BPS is operated.

If the APS and the BPS are simultaneously detected due to the driver's faulty manipulation, the hybrid control unit may apply the brake override function to ignore the APS change and calculate the required torque only based on the BPS change.

Meanwhile, the driver acceleration/deceleration prediction unit 130 generates a predicted value of the near-future acceleration/deceleration intention of the driver using the vehicle speed, the radar information, the navigation information, and the driving style of the driver as input information (S820). Here, Pedal(n+a) means the position of the acceleration/brake pedal after 'a' seconds. The value of a is preferably less than 5 seconds, but embodiments of the present invention are not limited thereto. In addition, the predicted value of the near-future acceleration/deceleration intention may mean the driver's acceleration intention (APS increase or BPS decrease) or deceleration intention (APS decrease or BPS increase) predicted after a predetermined time in the near future, and the amount of change thereof or the pedal position.

Using the predicted value of the acceleration/deceleration intention Pedal(n+a) of the driver acceleration/deceleration prediction unit 130, the hybrid control unit may predict the near-future required torque and transmit the predicted torque to the TCU (S830).

The TCU may compare the current required torque transmitted from the hybrid control unit with a first threshold value (S840). Here, the first threshold value is preferably a shifting threshold line.

If the current required torque is greater than or equal to the first threshold value, the TCU may compare the predicted required torque with a second threshold value (S850). Here, the second threshold value may be differently set according to the prediction point of time, and will be described later in detail with reference to FIG. 9.

If the predicted required torque is greater than the second threshold value, the TCU may determine downshift and transmit a gear-shift command to the transmission (S860).

If the current required torque is less than the first threshold value or the predicted required torque is less than the second threshold value, the current speed stage may be maintained (S 870). At this time, in order to satisfy the required torque while maintaining the speed stage according to the current required torque, when the current required torque exceeds the maximum engine torque of the corresponding stage, the hybrid control unit may transmit a torque command for instructing the motor control unit to generate a sufficient amount of torque to compensate for the insufficient torque.

Hereinafter, the second threshold value will be described with reference to FIG. 9.

Figure 9:
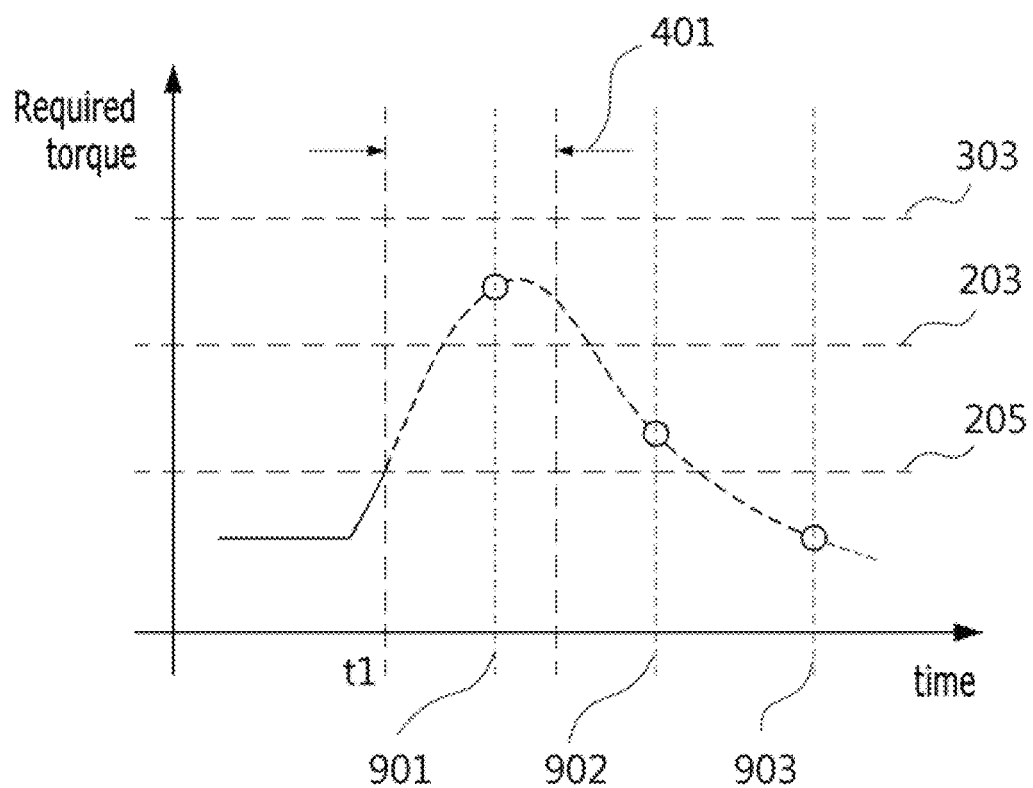
FIG. 9 illustrates a second threshold value for each point of time with which a predicted required torque is compared according to an embodiment of the present invention.

FIG. 9 illustrates a second threshold value for each point of time with which a predicted required torque is compared according to an embodiment of the present invention.

Referring to FIG. 9, the second threshold value may be one of 1) the sum of the maximum engine torque of a higher stage and the maximum motor torque, 2) the maximum engine torque of a higher stage, and 3) the shifting threshold line (assuming a non-hybrid vehicle or no-motor assistance in a hybrid vehicle). For example, when the near-future point of time 901(FIG. 9, Prediction time 1) is within a time required for shifting from the point of time of the gear-shift determination (the current time), the sum of the maximum engine torque of the higher stage and the maximum motor torque may be the second threshold value. When the near-future prediction point of time is within a first predetermined time after the time required for shifting 902(FIG. 9, Prediction time 2), the maximum engine torque of the higher stage may be the second threshold value. When the near-future prediction point of time is within a second predetermined time after the first predetermined time 903(FIG. 9, Prediction time 3), the shifting threshold line may be the second threshold value. In FIG. 9, reference numeral 203 refers to the higher stage (6-speed) maximum engine torque, reference numeral 205 refers to the K/D shifting 6→5 threshold line, reference numeral 303 is the higher stage(6-speed stage) engine+motor maximum torque, and reference numeral 401 refers to the required time for gear-shift.

However, the criterion and time range for the second threshold value for each near-future prediction point of time described above are illustrative, and embodiments of the present invention are not limited thereto. It is apparent to those skilled in the art that the second threshold value may be set to various values for more or fewer prediction points of time.

In the above-described embodiments, the driver's acceleration/deceleration intention prediction model has been described as being constructed and modified through machine learning scheme of the driver's future intention corresponding to the current driving condition based on the data accumulated during actual driving of the vehicle. However, instead of using such prediction model, the predicted value of the near-future acceleration/deceleration intention may be determined by pre-establishing a rule. An example of such rule is shown in Table 1 below.

TABLE 1

| Input signal | Analysis of driving situation | Expected result |
| --- | --- | --- |
| [Navi/Telematics] Road type = Highway Congestion information = Smooth Front event = none | Constant speed driving Intermittent braking for maintaining | APS = 0, BPS = Small |

TABLE 1-continued

| Input signal | Analysis of driving situation | Expected result |
| --- | --- | --- |
| [Radar] Front vehicle distance = Close Front vehicle relative velocity = −10 kph [Driving style/history] Constant speed driving for the past 5 minutes [Lane departure prevention system] Maintain the current lane | the distance from the preceding vehicle | |
| [Navi/Telematics] Road type = Highway Congestion information = Smooth Front event = Tollgate/200 m [Radar] Front vehicle distance = none Front vehicle relative speed = N/A [Driving style/history] Past toll pass average vehicle speed = 50 kph [Lane departure prevention system] Maintain the current lane | Highway driving To go through the tollgate, decrease current speed to 50 kph | APS = 0, BPS = Middle |

Further, although the future required torque has been described above as being predicted through near-future prediction, it may be replaced with an expected future acceleration value predicted by the acceleration/deceleration prediction unit. Thereby, the second threshold value may also be set to an acceleration value instead of the required torque. As a result, when the current required torque is greater than or equal to the first threshold value and the predicted acceleration at a near-future point of time is greater than or equal to the second threshold value represented by an acceleration, downshifting may be performed, and if not, the current speed stage may be maintained.

An aspect of the present invention described above may be implemented as a computer-readable code on a medium on which a program is recorded. The computer-readable medium includes all kinds of recording devices in which data that may be read by a computer system is stored. Examples of the computer-readable medium include a hard disk drive (HDD), a solid state drive (SSD), a silicon disk drive (SDD), a ROM, a RAM, a CD-ROM, a magnetic tape, a floppy disk, and an optical data storage device.

As apparent from the above description, embodiments of the present invention effects as follows.

A hybrid vehicle related to at least one embodiment of the present invention configured as described above may more efficiently control the transmission.

Particularly, unnecessary gear-shifts may be minimized because whether or not to perform gear-shift is determined through prediction of a near-future required torque using machine learning scheme and comparison with a reference threshold according to time. As a result, energy consumption occurring during the gear-shift process may be reduced, and improvement in fuel efficiency on the actual road may be expected.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

It will be appreciated by those skilled in the art that effects of embodiments of the present invention are not limited to what has been described above and other effects of the present invention will be clearly understood from the following detailed description taken in conjunction with the accompanying drawings.

It will be apparent to those skilled in the art that various modifications and variations can be made in the present invention without departing from the spirit or scope of the inventions. Thus, it is intended that the present disclosure covers modifications and variations of this invention provided they come within the scope of the appended claims and their equivalents.

What is claimed is:

1. A method of controlling a transmission of a hybrid vehicle, comprising:
   determining a first torque, the first torque being a current required torque;
   determining a second torque, the second torque being a required torque expected to be generated at a near-future time after a current time;
   comparing, when the first torque is greater than or equal to a first threshold, the second torque with a second threshold set according to the near-future time; and
   performing downshifting when the second torque is greater than or equal to the second threshold as a result of the comparison.

2. The method according to claim 1, further comprising:
   maintaining a current transmission gear stage when the first torque is less than the first threshold or when the second torque is less than the second threshold as a result of the comparison.

3. The method according to claim 2, further comprising:
   generating a third torque in a motor when the current transmission gear stage is maintained and the first torque exceeds a maximum engine torque corresponding to the current transmission gear stage by the third torque.

4. The method according to claim 1, wherein the determining of the first torque comprises:
   determining positions of an accelerator pedal and a brake pedal; and
   determining the first torque using the determined positions.

5. The method according to claim 1, wherein the determining of the second torque comprises:
   determining a predicted value of an acceleration/deceleration intention of a driver using an acceleration/deceleration prediction model having at least one of driver propensity information, advanced driver assistance system (ADAS) information, navigation information, and vehicle speed information as an input value; and
   determining the second torque using the predicted value of the acceleration/deceleration intention.

6. The method according to claim 5, wherein the acceleration/deceleration prediction model is persistently modified through machine learning-based learning.

7. The method according to claim 5, wherein the predicted value of the acceleration/deceleration intention comprises position information on the accelerator pedal and the brake pedal at the near-future time.

8. The method according to claim 1, wherein the first threshold value is variable according to a speed of the vehicle and is set to be lower than a maximum engine torque corresponding to a current transmission gear stage.

9. The method according to claim 1, wherein the second threshold value is determined as one of the first threshold value, a maximum engine torque corresponding to a current transmission gear stage and a sum of the maximum engine torque and a maximum motor torque, depending on the near-future time.

10. A hybrid vehicle comprising:
    a driving information detection unit configured to interoperate with various sensors of the hybrid vehicle to detect driving information according to operation of the vehicle;
    a driver acceleration/deceleration prediction unit configured to generate a predicted value of a near-future acceleration/deceleration intention of a driver reflecting a driving environment of the vehicle, using information transmitted from the driving information detection unit by utilizing an acceleration/deceleration prediction model;
    a hybrid control unit configured to determine a first torque and determine a second torque using the predicted value of the near-future acceleration/deceleration intention, the first torque being a current required torque and the second torque being a required torque expected to be generated at a near-future time after a current time; and
    a transmission control unit configured to compare, when the first torque is greater than or equal to a first threshold, the second torque with a second threshold set according to the near-future time and to control a transmission to perform downshifting when the second torque is greater than or equal to the second threshold as a result of the comparison.

11. The hybrid vehicle according to claim 10, wherein transmission control unit performs a control operation to maintain a current transmission gear stage when the first torque is less than the first threshold or when the second torque is less than the second threshold as a result of the comparison.

12. The hybrid vehicle according to claim 11, wherein, when the current transmission gear stage is maintained and the first torque exceeds a maximum engine torque corresponding to the current transmission gear stage by the third torque,
    the hybrid control unit transmits, to a motor control unit, a torque command to generate the third torque through the motor.

13. The hybrid vehicle according to claim 10, wherein the hybrid control unit determines the first torque using positions of an accelerator pedal and a brake pedal detected by the driving information detection unit.

14. The hybrid vehicle according to claim 10, wherein the driver acceleration/deceleration prediction unit generates the predicted value of the acceleration/deceleration intention using the acceleration/deceleration prediction model having at least one of driver propensity information, advanced driver assistance system (ADAS) information, navigation information, and vehicle speed information as an input value.

15. The hybrid vehicle according to claim 14, wherein the acceleration/deceleration prediction model is persistently modified through machine learning-based learning.

16. The hybrid vehicle according to claim 14, wherein the predicted value of the acceleration/deceleration intention comprises position information on an accelerator pedal and a brake pedal at the near-future time.

17. The hybrid vehicle according to claim 10, wherein the first threshold value is variable according to a speed of the vehicle and is set to be lower than a maximum engine torque corresponding to a current transmission gear stage.

18. The hybrid vehicle according to claim 10, wherein the second threshold value is determined as one of the first threshold value, a maximum engine torque corresponding to a current transmission gear stage and a sum of the maximum engine torque and a maximum motor torque, depending on the near-future time.

19. A hybrid vehicle comprising:
- a driving information detection unit configured to interoperate with various sensors of the hybrid vehicle to detect driving information according to operation of the vehicle;
- a driver acceleration/deceleration prediction unit configured to generate a predicted value of a near-future acceleration/deceleration intention of a driver reflecting a driving environment of the vehicle, using information transmitted from the driving information detection unit by utilizing an acceleration/deceleration prediction model;
- a hybrid control unit configured to determine a first torque and determine a second torque using the predicted value of the near-future acceleration/deceleration intention, the first torque being a current required torque and the second torque being a required torque expected to be generated at a near-future time after a current time; and
- a transmission control unit configured to transmit a gearshift command to a transmission to perform downshifting when the first torque is greater than or equal to a first threshold value, wherein the hybrid control unit controls the transmission control unit to maintain a current transmission gear stage when the first torque is less than the first threshold value or when the second torque is less than a second threshold value set according to the near-future time as a result of comparison between the second torque and the second threshold value.

* * * * *